United States Patent
Zhang et al.

(10) Patent No.: US 11,825,064 B2
(45) Date of Patent: Nov. 21, 2023

(54) LIGHT FIELD DISPLAY METHOD AND SYSTEM, STORAGE MEDIUM AND DISPLAY PANEL

(71) Applicant: BOE TECHNOLOGY GROUP CO., LTD., Beijing (CN)

(72) Inventors: Qingxun Zhang, Beijing (CN); Jian Gao, Beijing (CN); Sen Ma, Beijing (CN); Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 17/627,497

(22) PCT Filed: Mar. 31, 2021

(86) PCT No.: PCT/CN2021/084340
§ 371 (c)(1),
(2) Date: Jan. 14, 2022

(87) PCT Pub. No.: WO2021/197370
PCT Pub. Date: Oct. 7, 2021

(65) Prior Publication Data
US 2022/0321857 A1    Oct. 6, 2022

(30) Foreign Application Priority Data
Mar. 31, 2020  (CN) .......................... 202010247281.6

(51) Int. Cl.
*H04N 13/122*    (2018.01)
*H04N 13/128*    (2018.01)
(Continued)

(52) U.S. Cl.
CPC ......... *H04N 13/122* (2018.05); *H04N 13/128* (2018.05); *H04N 13/305* (2018.05); *H04N 13/383* (2018.05)

(58) Field of Classification Search
CPC .. H04N 13/122; H04N 13/128; H04N 13/305; H04N 13/383; H04N 13/307; G06T 7/557; G06T 7/596
(Continued)

(56) References Cited

U.S. PATENT DOCUMENTS 8,248,458 B2 *   8/2012  Schowengerdt .....  G02B 26/005
                                                    348/51
10,664,953 B1 *  5/2020  Lanman ................. G06N 5/046
(Continued)

FOREIGN PATENT DOCUMENTS

CN    101072366 A    11/2007
CN    102282590 A    12/2011
(Continued)

OTHER PUBLICATIONS

China Patent Office, First Office Action dated Aug. 30, 2021 for application No. CN202010247281.6.
(Continued)

*Primary Examiner* — Tung T Vo
(74) *Attorney, Agent, or Firm* — HOUTTEMAN LAW LLC

(57) ABSTRACT

A light field display method includes: generating a pixel light field information database (S1); processing, according to different depth positions of an original three-dimensional image, slice images corresponding to the different depth positions and pixel light field information at the different depth positions, to obtain recorded images of the slice images of the original three-dimensional image at the different depth positions (S2); and superimposing the recorded images of the slice images of the original three-dimensional image at the different depth positions, to obtain a microcell array image of the original three-dimensional image (S3). A light field display system has a database generator (101), a
(Continued)

recorded image generator (102), and a superimposer (103) which implement the described functions. A non-transitory computer readable storage medium stores thereon a computer program for implementing the method. A display panel includes the non-transitory computer readable storage medium.

20 Claims, 8 Drawing Sheets

(51) Int. Cl.
  *H04N 13/305* (2018.01)
  *H04N 13/383* (2018.01)
(58) Field of Classification Search
  USPC .......................................................... 148/51
  See application file for complete search history.

(56) References Cited

U.S. PATENT DOCUMENTS

| | | | |
|---|---|---|---|
| 10,939,085 B2* | 3/2021 | Li | G06T 15/06 |
| 2004/0150583 A1* | 8/2004 | Fukushima | G02B 30/27 345/6 |
| 2008/0117289 A1* | 5/2008 | Schowengerdt | G02B 26/005 348/E13.032 |
| 2010/0157399 A1* | 6/2010 | Kroll | G03H 1/02 359/11 |
| 2012/0320049 A1 | 12/2012 | Kim et al. | |
| 2012/0327082 A1 | 12/2012 | Kim | |
| 2014/0118507 A1 | 5/2014 | Noh et al. | |
| 2014/0340389 A1* | 11/2014 | Lanman | H04N 13/344 345/589 |
| 2014/0340390 A1* | 11/2014 | Lanman | G02B 27/017 345/589 |
| 2016/0142615 A1 | 5/2016 | Liang et al. | |
| 2016/0260258 A1* | 9/2016 | Lo | G02B 27/0172 |
| 2017/0237918 A1* | 8/2017 | Norris | H04N 25/704 348/46 |
| 2017/0270644 A1* | 9/2017 | Zhao | G06T 7/50 |
| 2019/0020869 A1* | 1/2019 | Perreault | G02B 3/0006 |
| 2020/0068191 A1* | 2/2020 | Yu | G02B 27/0176 |
| 2020/0371378 A1* | 11/2020 | Makinen | G02B 30/50 |
| 2021/0014473 A1* | 1/2021 | Hua | G02B 30/27 |
| 2021/0136354 A1* | 5/2021 | Valli | H04N 13/128 |

FOREIGN PATENT DOCUMENTS

| | | |
|---|---|---|
| CN | 103647960 A | 3/2014 |
| CN | 105323573 A | 2/2016 |
| CN | 105791803 A | 7/2016 |
| CN | 106257454 A | 12/2016 |
| CN | 107402453 A | 11/2017 |
| CN | 107580207 A | 1/2018 |
| CN | 107783291 A | 3/2018 |
| CN | 108141610 A | 6/2018 |
| CN | 108513123 A | 9/2018 |
| CN | 109672873 A | 4/2019 |
| CN | 109788901 A | 5/2019 |
| CN | 109803133 A | 5/2019 |
| CN | 109946916 A | 6/2019 |
| CN | 110276823 A | 9/2019 |
| CN | 110662014 A | 1/2020 |
| CN | 111427166 A | 7/2020 |
| TW | 201909628 A | 3/2019 |

OTHER PUBLICATIONS

Yuanzhi LV:"Research on generation, coding and display of elemental image array in integral imaging system", Doctoral Dessertation, JILIN University, Sep. 15, 2014.

* cited by examiner

LIGHT FIELD DISPLAY METHOD AND SYSTEM, STORAGE MEDIUM AND DISPLAY PANEL

This is a National Phase Application filed under 35 U.S.C. 371 as a national stage of PCT/CN2021/084340 filed on Mar. 31, 2021, an application claiming priority from Chinese patent application No. 202010247281.6 filed on Mar. 31, 2020, the entirety of each of which is incorporated hereby by reference.

TECHNICAL FIELD

The present disclosure relates to the field of display technology, and specifically relates to a light field display method, a light field display system, a storage medium, and a display panel.

BACKGROUND

In the real natural world, objects seen by human eyes are three-dimensional, but a conventional display method can only present two-dimensional pictures without depth information. The three-dimensional display technology, capable of showing the depth information of an object, can reflect the real object more truly, and thus improve the visual perception. There are many technologies capable of implementing 3D stereoscopic display, such as parallax barrier display, volumetric 3D display, holographic display, light field display, and the like. Due to the conflict between monocular focusing and binocular convergence, the parallax barrier type 3D display may generate a dizzy feeling when viewed for a long time. In the light field display type 3D display technology, no dizzy feeling is generated during observation since monocular focusing and binocular convergence are at the same position, and monocular depth adjustment display can be realized in combination with a focusing function of the crystalline lens in human eyes. As one of the light field display technologies, the integrated (or integral) imaging light field display technology utilizes the computer simulation light field imaging technology, which can address a plurality of problems caused by limitations such as a device size or the like during the actual optical integrated imaging process, and therefore has a promising application prospect. However, the conventional method for generating a cell array image (which may also be referred to as an elemental image array) is computationally intensive and inefficient. Therefore, it is desirable to develop efficient methods and products for generating a cell array image.

SUMMARY

Embodiments of the present disclosure provide a light field display method, a light field display system, a computer readable storage medium, and a display panel.

In a first aspect, the present disclosure provides a light field display method, including:
generating a pixel light field information database;
processing, according to different depth positions of an original three-dimensional image, slice images corresponding to the different depth positions and pixel light field information at the different depth positions, to obtain recorded images of the slice images of the original three-dimensional image at the different depth positions; and
superimposing the recorded images of the slice images of the original three-dimensional image at the different depth positions, to obtain a microcell array image of the original three-dimensional image.

In an embodiment, the generating the pixel light field information database includes:
determining a pupil position, an angle of field of view, and a viewing distance according to information on a display screen and information on a micro lens array; wherein the micro lens array includes a plurality of micro lenses arranged in an array, and the display screen includes a plurality of sub-pixels arranged in an array;
determining an active imaging area and an inactive imaging area of the display screen according to the pupil position, the angle of field of view and the viewing distance;
enabling each micro lens in the active imaging area to correspond to multiple sub-pixels on the display screen and process simulated light rays emitted from the plurality of sub-pixels, to form a microcell light field; and
combining all the microcell light fields in the active imaging area to obtain the pixel light field information database.

In an embodiment, the processing, according to different depth positions of the original three-dimensional image, slice images corresponding to the different depth positions and pixel light field information at the different depth positions, to obtain recorded images of the slice images of the original three-dimensional image at the different depth positions includes:
obtaining a plurality of depth positions of the original three-dimensional image;
projecting pixel light field information to the plurality of depth positions of the original three-dimensional image; and
simulating to light up sub-pixels of a display screen according to information on object points on the slice images at the different depth positions of the original three-dimensional image, to generate recorded images corresponding to the slice images at the respective depth positions.

The information on object points includes gray scale information of sub-pixels of which the pixel gray scale is not 0 on the slice images at the different depth positions.

In an embodiment, the enabling each micro lens in the active imaging area to correspond to the multiple sub-pixels on the display screen and process simulated light rays emitted from the multiple sub-pixels, to form a microcell light field includes:
obtaining a correspondence relationship between each micro lens in the active imaging area and sub-pixels of the display screen; and
combining light field information of the light rays emitted from the multiple sub-pixels on the display screen corresponding to the micro lens, to form the microcell light field of the micro lens.

In an embodiment, the combining light field information of the light rays emitted from the multiple sub-pixels on the display screen corresponding to the micro lens, to form the microcell light field of the micro lens includes:
generating a space rectangular coordinate system including a plane rectangular coordinate system composed of an X axis and a Y axis generated in a plane where the micro lens array is located, and a Z axis vertical to a plane where the plane rectangular coordinate system is located; wherein an origin of the space rectangular coordinate system is a center of the micro lens at the center of the micro lens array; and wherein the light field information of the microcell light field of each micro lens is (x_M, y_M, z_M, α_pixel, β_pixel); where x_M is an X-axis coordinate of the micro lens in the space rectangular coordinate system; y_M is a Y-axis coordinate of the micro lens in the space rectangular coordinate system; and z_M is a Z-axis coordinate of the micro lens in the space rectangular coordinate system; and $$\alpha\_pixel = atan\left(\frac{y\_p - y\_M}{x\_p - x\_M}\right);$$

$$\beta\_pixel = atan\left(\frac{\sqrt{(y\_p - y\_M)^2 + (x\_p - x\_M)^2}}{z\_p - z\_M}\right)$$

where x_p is an X-axis coordinate of a sub-pixel on the display screen corresponding to the micro lens in the space rectangular coordinate system; y_p is a Y-axis coordinate of the sub-pixel on the display screen corresponding to the micro lens in the space rectangular coordinate system; and z_p is a Z-axis coordinate of the sub-pixel on the display screen corresponding to the micro lens in the space rectangular coordinate system.

In an embodiment, the superimposing the recorded images of the slice images of the original three-dimensional image at the different depth positions, to obtain the microcell array image of the original three-dimensional image includes:

obtaining the recorded images of the slice images at the different depth positions; and superimposing the recorded images of the slice images at the different depth positions to obtain the microcell array image of the original three-dimensional image.

In an embodiment, the superimposing the recorded images of the slice images at the different depth positions to obtain the microcell array image of the original three-dimensional image includes:

obtaining a recorded image n, which is a microcell array image obtained after the first computation, for n slice images of the original three-dimensional image at the different depth positions;

obtaining a recorded image (n-1), which is then superimposed with the recorded image n to obtain a microcell array image after the second computation;

obtaining a recorded image (n-2), which is then superimposed with the recorded image (n-1) to obtain a microcell array image after the third computation; and repeating the process until obtaining a microcell array image after the n-th computation as the microcell array image of the original three-dimensional image;

where n represents the number of slice images of the original three-dimensional image at different depth positions, and n is an integer greater than 1, and for the n slice images of the original three-dimensional image at the different depth positions, a slice image (m-1) at a depth position and a slice image m at another depth position are slice images at any two adjacent depth positions, and the slice image (m-1) at the depth position is closer to a pupil position than the slice image m at the another depth position, where 2≤m≤n.

In an embodiment, the obtaining the recorded image (n-1), which is then superimposed with the recorded image n to obtain the microcell array image after the second computation includes: judging whether the gray scale value of each sub-pixel of the recorded image (n-1) is 0; if the gray scale value of a sub-pixel of the recorded image (n-1) is 0, setting the gray scale value of the sub-pixel at that position of the microcell array image after the second computation to a gray scale value of the corresponding sub-pixel position in the microcell array image after the first computation; and if the gray scale value of a sub-pixel of the recorded image (n-1) is not 0, setting the gray scale value of the sub-pixel at that position of the microcell array image after the second computation to a gray scale value of the corresponding sub-pixel position of the recorded image (n-1).

The obtaining the recorded image (n-2), which is then superimposed with the recorded image (n-1) to obtain the microcell array image after the third computation includes: judging whether the gray scale value of each sub-pixel of the recorded image (n-2) is 0; if the gray scale value of a sub-pixel of the recorded image (n-2) is 0, setting the gray scale value of the sub-pixel at that position of the microcell array image after the third computation to a gray scale value of the corresponding sub-pixel position in the microcell array image after the second computation; and if the gray scale value of a sub-pixel of the recorded image (n-2) is not 0, setting the gray scale value of the sub-pixel at that position of the microcell array image after the third computation to a gray scale value of the corresponding sub-pixel position of the recorded image (n-2).

In an embodiment, the simulating to light up sub-pixels of the display screen according to information on object points on the slice images at the different depth positions of the original three-dimensional image, to generate recorded images corresponding to the slice images at the respective depth positions includes:

denoising the slice images of the original three-dimensional image at one or more depth positions.

In an embodiment, the denoising the slice images of the original three-dimensional image at one or more depth positions includes:

selecting a depth image k of the original three-dimensional image;

successively judging whether a gray scale value of each sub-pixel of the depth image k of the original three-dimensional image is smaller than a prescribed value a;

if the gray scale value of a sub-pixel of the depth image k of the original three-dimensional image is smaller than the prescribed value a, replacing the gray scale value of the sub-pixel with 0; and if the gray scale value of a sub-pixel of the depth image k of the original three-dimensional image is not smaller than the prescribed value a, keeping the gray scale value of the sub-pixel unchanged;

thereby obtaining a denoised depth image k of the three-dimensional image;

where a>0; and k is a positive integer.

In an embodiment, the micro lens array is located on a display side of the display screen;

the information on the display screen includes a size of each sub-pixel on the display screen; and the information on the micro lens array includes a radial dimension of each micro lens and a distance between the micro lens array and the display screen.

n an embodiment, the information on the display screen further includes a size of the display screen.

In an embodiment, the information on the micro lens array further includes a shape, a focal length, a radius of curvature, and a refractive index of each of the plurality of micro lenses.

In an embodiment, each of the micro lens is a convex lens or a set of lenses.

In an embodiment, an orthogonal projection of each micro lens on the display screen has any one of a hexagonal shape, an elliptical shape, a circular shape, or a diamond shape.

In an embodiment, the depth refers to a distance between the plane where each slice image is located and the plane where the micro lens array is located.

In an embodiment, the combining all the microcell light fields in the active imaging area includes: storing the microcell light field, which is obtained by processing, by a micro lens in the active imaging area, the simulated light rays emitted from the sub-pixels on the display screen corresponding to the micro lens in the active imaging area, in a database to form a data set.

In a second aspect, the present disclosure provides a light field display system, including:
 a database generator configured to generate a pixel light field information database;
 a recorded image generator configured to process, according to different depth positions of an original three-dimensional image, slice images corresponding to the different depth positions and pixel light field information at the different depth positions, to obtain recorded images of the slice images of the original three-dimensional image at the different depth positions; and
 a superimposer configured to superimpose the recorded images of the slice images of the original three-dimensional image at the different depth positions, to obtain a microcell array image of the original three-dimensional image.

In a third aspect, the present disclosure provides a non-transitory computer readable storage medium having stored thereon a computer program which, when executed by a processor, implements the light field display method according to any one of the above embodiments in the first aspect of the present disclosure.

In a fourth aspect, the present disclosure provides a display panel, including a non-transitory computer readable storage medium according to any one of the above embodiments in the third aspect of the present disclosure.

DETAIL DESCRIPTION OF EMBODIMENTS

To improve understanding of technical solutions of the present disclosure for one of ordinary skill in the art, the light field display method, the light field display system, the storage medium and the display panel provided in the present disclosure are described in further detail below with reference to the accompanying drawings and exemplary implementations.

The inventors of the present inventive concept have found that, the integrated imaging light field display technology at present mainly includes two parts, i.e., an acquisition system and a reconstruction system. The effect of light field acquisition, which plays an important role, directly affects the imaging effect of the system. The light field acquisition mainly adopt two modes, one is optical acquisition, and the other is computer simulation light field acquisition. The optical acquisition is limited to a certain extent due to the dependency on an external device such as a light field camera, complicated structure and high cost. In contrast, the computer acquisition can simulate a three-dimensional space scenario, and directly acquire and obtain a cell array image, thereby getting more and more attention.

When using a computer simulation light field acquisition system, a conventional method for generating a cell array image typically includes: after an original three-dimensional image of a three-dimensional object is split into multiple layers (i.e., multiple slice images), emitting many light rays from each point on the three-dimensional object, where a primary light ray passing through the center of a pinhole or a micro lens intersects with a plane (i.e., a plane where each slice image is located) of an imaging detector (e.g., a charge-coupled device (CCD), a complementary metal oxide semiconductor (CMOS), etc.) to form a pixel in a cell array image, and repeating the above process for each point on the object, to finally obtain a cell array image on the imaging detector. This method involves a large calculation amount, low efficiency and high requirement on a calculation processor. It is therefore of vital importance to develop an efficient method for generating a cell array image.

It should be noted that the light field display method provided in the present disclosure is a process of acquiring and calculating pixel gray scale distribution through a computer simulation light field. In the computer simulation process, the operations like "emitting light rays", "forming a light field" and "lighting up" represent the computer simulation analysis process.

Figure 1:
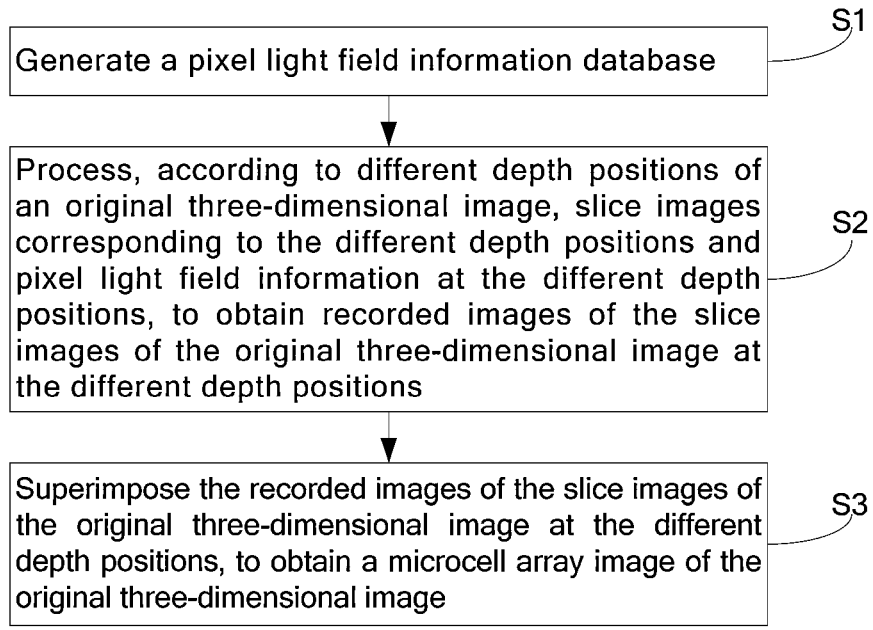
FIG. 1 is a flowchart of a light field display method according to an embodiment of the present disclosure.

An embodiment of the present disclosure further provides a light field display method, as shown in FIG. 1. The light field display method may include the following steps S1 to S3.

Step S1 includes a pixel light field information database (or a database of pixel light field information).

Step S2 includes processing, according to different depth positions of an original three-dimensional image, slice images corresponding to the different depth positions and pixel light field information at the different depth positions, to obtain recorded images of the slice images of the original three-dimensional image at the different depth positions.

Step S3 includes superimposing the recorded images of the slice images of the original three-dimensional image at the different depth positions, to obtain a microcell array image of the original three-dimensional image.

This light field display method generates a pixel light field information database through calculation. After the pixel light field information database is generated, the subsequent processing to obtain recorded images of the slice images of the original three-dimensional image at the different depth positions, and to obtain a microcell array image of the original three-dimensional image, are both based on the calculation results in the pixel light field information database, so no further calculation is needed. Therefore, compared with the conventional method for generating a microcell array image of the original three-dimensional image, in the light field display method provided by the present disclosure, the calculation amount is reduced, and the microcell array image of the original three-dimensional image can be obtained more efficiently.

Figure 2:
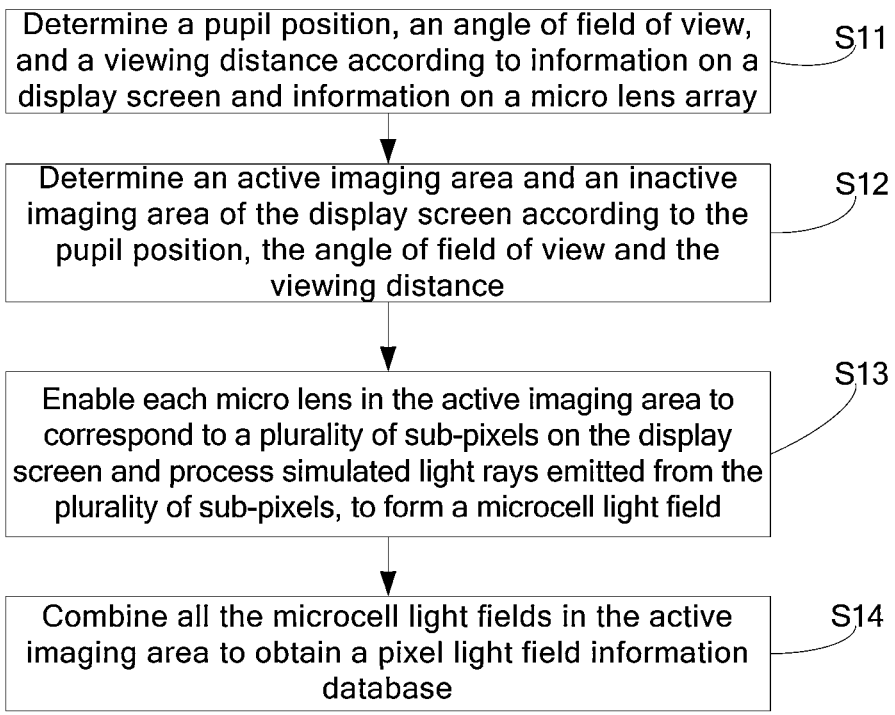
FIG. 2 is a detailed flowchart of step S1 in the light field display method shown in FIG. 1.

As described above, the light field display method provided in the embodiment of FIG. 1 may include step S1 of generating a pixel light field information database. In an embodiment, step S1 may include the following steps S11 to S14, as shown in FIG. 2.

Step S11 includes determining a pupil position, an angle of field of view, and a viewing distance according to information on a display screen and information on a micro lens array. For example, the micro lens array includes a plurality of micro lenses arranged in an array; and the display screen includes a plurality of sub-pixels arranged in an array (see FIGS. 4 and 5).

For example, the micro lens array is located on a display side of the display screen. The information on the display screen includes a size (or a dimension) of the display screen and a size (or a dimension) of each sub-pixel on the display screen. The information on the micro lens array includes a shape, a radial dimension, a focal length, a radius of curvature, and a refractive index of each micro lens, and a distance between the micro lens array and the display screen. In this embodiment, a pinhole array is used for simulating the micro lens array. An orthogonal projection of each micro lens on the display screen may have any one of a hexagonal (e.g., regular hexagonal) shape, an elliptical shape, a circular shape, or a diamond shape. Each simulated micro lens may be a convex lens or a lens set, and the specific form thereof is not limited in the present disclosure as long as the micro lens can implement the light field display function in combination with the display screen.

Step S12 includes determining an active imaging area and an inactive imaging area of the display screen according to the pupil position, the angle of field of view and the viewing distance. For example, the pupil position may refer to a distance between a central axis of each pupil and a central axis of the display screen, or a distance between a perpendicular bisector of a connection line of two pupils of each user and the central axis of the display screen.

For example, the active imaging area refers to an area of the display screen that can be clearly recognized by human eyes, and in which the micro lenses and corresponding pixel areas participate in the acquisition and calculation of the microcell array image. The inactive imaging area refers to an area that cannot be clearly recognized by human eyes due to a too large viewing angle relative to human eyes, and in which the micro lenses and corresponding pixel areas do not participate in the acquisition and calculation of the microcell array image.

Figure 3:
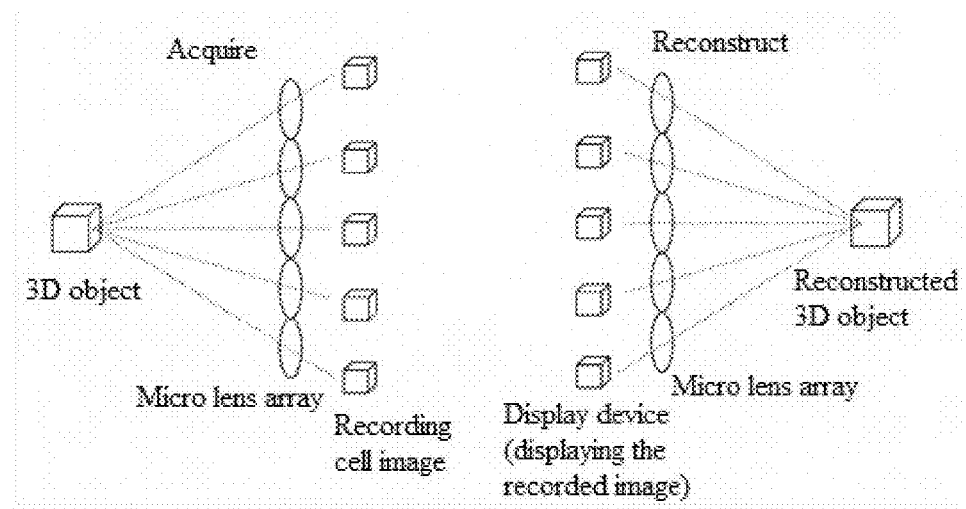
FIG. 3 is a schematic diagram showing principles of acquiring and reconstructing a microcell array image of light field display according to an embodiment of the present disclosure.

FIG. 3 is a schematic diagram showing principles of acquiring and reconstructing a microcell array image of light field display according to an embodiment of the present disclosure. The principle of acquiring a cell image includes that points on a three-dimensional object are imaged on a recording device after passing through a micro lens, and the image on the recording device is formed by pixel points on a display screen and the like. In the reconstruction of the microcell array image of light field display, the image part displayed by each pixel point on the display screen participates in the image reconstruction of the three-dimensional object, so the image acquisition and calculation of the three-dimensional object before the reconstruction are quite complicated.

Figure 4:
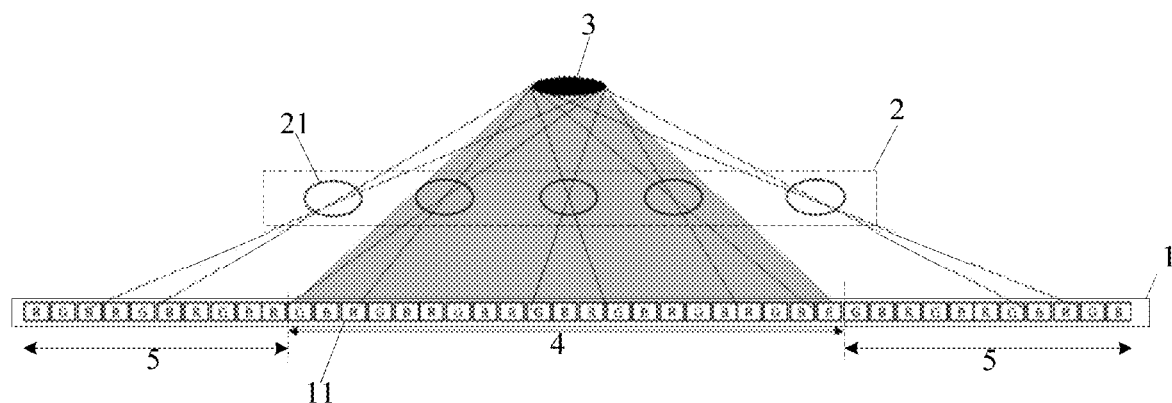
FIG. 4 is a light field diagram of some sub-pixels in a light field display method according to an embodiment of the present disclosure.

In another embodiment of the present disclosure, as shown in FIG. 4, the actual application scenario of a device determines the information on the display screen 1 (including a size of the display screen 1 and a size of each sub-pixel 11), and the information on the micro lens array 2 (including a radial dimension, a focal length, a radius of curvature, and a refractive index of each micro lens 21, and a distance between the micro lens 21 and the display screen 1 (i.e., a distance between the micro lens array 2 and the display screen 1). A position, an angle of field of view, and a viewing distance of the pupil 3 are calculated and determined according to the information on the display screen 1 and the information on the micro lens array 2; and an active imaging area 4 and an inactive imaging area 5 are calculated and determined according to the position, the angle of field of view and the viewing distance of the pupil 3. The micro lenses and corresponding pixel areas in the active imaging area 4 participate in the acquisition and calculation of the microcell array image. The micro lenses and corresponding pixel areas in the inactive imaging area 5 do not participate in the acquisition and calculation of the microcell array image. In this way, the acquisition and calculation of the microcell array image in the embodiment of FIG. 4 can have improved efficiency in acquisition and calculation, compared with the acquisition and calculation of the microcell array image in the light field display shown in FIG. 3.

Figure 5:
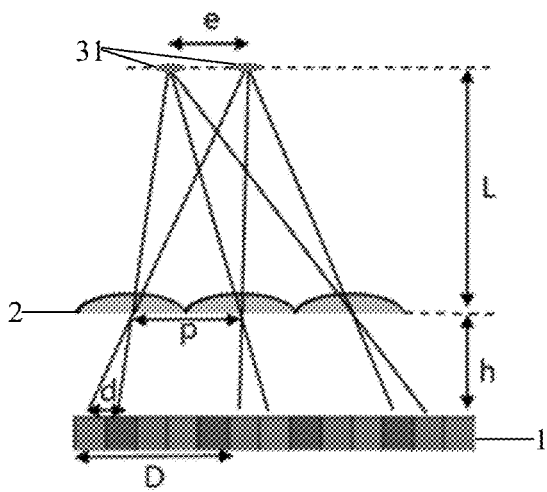
FIG. 5 is a schematic diagram showing a relationship between information on a display screen (or a display panel), information on a micro lens array, and information on human eyes according to an embodiment of the present disclosure.

In an embodiment, as shown in FIG. 5, the information on the display screen 1 and the information on the micro lens array 2 have the following relationship with the information on human eyes (including the position and the viewing distance of the pupil 3):

$$\frac{d}{e} = \frac{h}{L}; \frac{p}{D} = \frac{L}{h+L};$$

where h is a distance between the micro lens array 2 and the display screen 1; p is a radial dimension of each micro lens (e.g., a diameter of each micro lens); e is a distance between viewpoints 31 (e.g., a distance between two pupils); L is a distance from human eyes to the display screen 1 (e.g., a distance between a connection line of the two pupils and a plane where the micro lens array is located); d is a size of each sub-pixel on the display screen 1 (e.g., when each sub-pixel is a circle, a diameter of the circle; or when each sub-pixel is a square, a side length of the square); and D is a pixel period (i.e., a period of pixels) on the display screen 1 corresponding to the micro lens array 2 (e.g., a diameter of a portion of the display screen 1, the portion being generally circular and being viewed by a single eye through centers of two adjacent micro lenses). The human eyes are directly above the center of the display screen 1 (e.g., the distance between the perpendicular bisector of the connection line of two pupils of the user and the central axis of the display screen is zero), and the angle of field of view (e.g., the maximum angle between connection lines respectively connecting a center of a single pupil to two points on both edges of the active imaging area 4) is in the range of ±15°, i.e., −15° to +15°.

Step S13 includes enabling each micro lens in the active imaging area to correspond to a plurality of sub-pixels on the display screen and process simulated light rays emitted from the plurality of sub-pixels, to form a microcell light field.

For example, each micro lens processes the light rays emitted from the corresponding sub-pixels to form a corresponding microcell light field. A plurality of micro lenses are correspondingly distributed in the active imaging area so that a plurality of microcell light fields are formed in the active imaging area.

For example, step S13 may include the following steps S131 and step S132.

Step S131 includes obtaining a correspondence relationship between each micro lens in the active imaging area and sub-pixels of the display screen.

In this step, the determining factor for the correspondence relationship between each micro lens in the active imaging area and the sub-pixels of the display screen includes the information on the display screen and the information on the micro lens array. It should be noted that there is a many-to-one mapping relationship between the sub-pixels of the display screen and each micro lens. That is, the light rays emitted from each sub-pixel of the display screen corresponds to a unique micro lens; but one micro lens may process a plurality of light rays emitted from corresponding sub-pixels of the display screen. The simulated light rays emitted from each sub-pixel are created in a coordinate system (as described below) to obtain light field information of the simulated light rays emitted from each sub-pixel.

Step S132 includes combining light field information of the light rays emitted from the plurality of sub-pixels on the display screen corresponding to the micro lens, to form the microcell light field of the micro lens.

For example, a plurality of micro lenses are correspondingly distributed in the active imaging area, a plane rectangular coordinate system composed of an X axis and a Y axis in a plane where the micro lens array is located, and a Z axis vertical to a plane where the plane rectangular coordinate system is located, are generated to obtain a space rectangular coordinate system. An origin of the space rectangular coordinate system is a center of the micro lens at the center of the micro lens array. The plane where the display screen is located is parallel to the plane where the micro lens array is located. As an example, if the entire micro lens array has a shape of a rectangle, a longer side of the rectangle is taken as the X axis, a shorter side of the rectangle is taken as the Y axis, and a center of the micro lens at the center of the micro lens array is taken as the origin, to form the space rectangular coordinate system. A plurality of microcell light fields are formed in the active imaging area, and the light field information of each microcell light field is $L\_M_{ij}$ (x_M, y_M, z_M, $\alpha$_pixel, $\beta$_pixel); where x_M is an X-axis coordinate of the micro lens in the space rectangular coordinate system; y_M is a Y-axis coordinate of the micro lens in the space rectangular coordinate system; and z_M is a Z-axis coordinate of the micro lens in the space rectangular coordinate system; and $$\alpha\_pixel = a\tan\left(\frac{y\_p - y\_M}{x\_p - x\_M}\right);$$

$$\beta\_pixel = a\tan\left(\frac{\sqrt{(y\_p - y\_M)^2 + (x\_p - x\_M)^2}}{z\_p - z\_M}\right)$$

where x_p is an X-axis coordinate of a sub-pixel on the display screen corresponding to the micro lens in the space rectangular coordinate system; y_p is a Y-axis coordinate of the sub-pixel on the display screen corresponding to the micro lens in the space rectangular coordinate system; and z_p is a Z-axis coordinate of the sub-pixel on the display screen corresponding to the micro lens in the space rectangular coordinate system. For example, the light field information of the microcell light field is $L\_M_{ij}$, where the subscripts i and j respectively represent the row number and the column number of each of the plurality of micro lenses corresponding to the plurality of microcell light fields formed in the active imaging area in the micro lens array. For example, $\alpha$_pixel may represent an angle between a projection of a light ray on the XY plane and the X axis, and $\beta$_pixel may represent an angle between the light ray and the Z axis.

Step S14 includes combining all the microcell light fields in the active imaging area to obtain the pixel light field information database.

Figure 6:
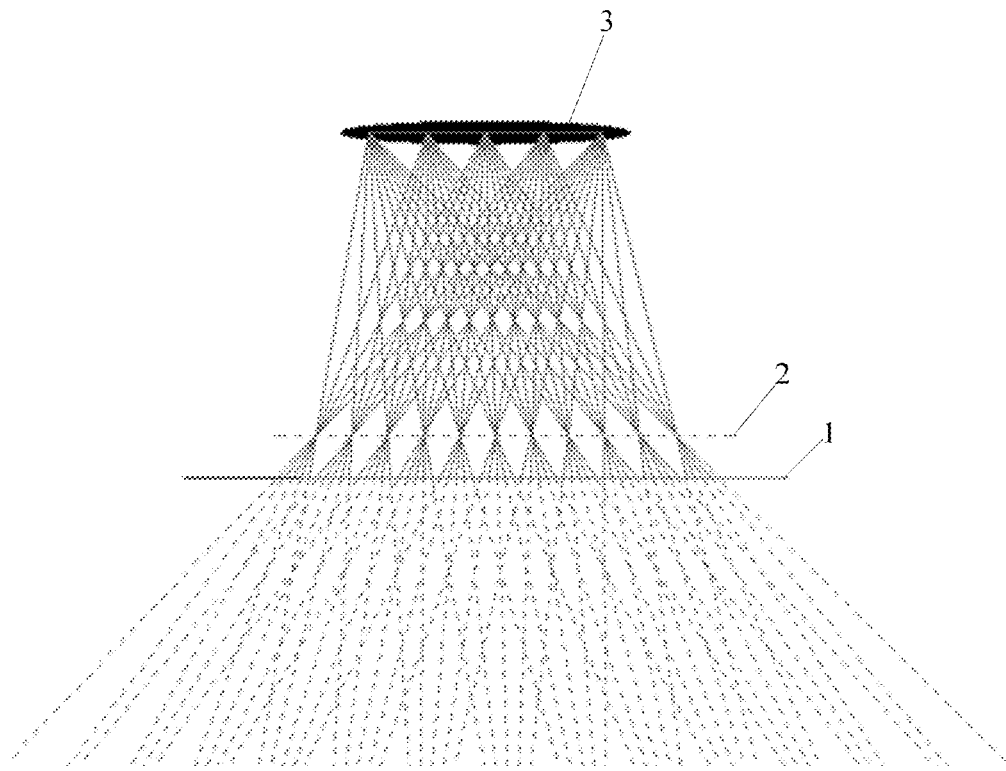
FIG. 6 is a schematic diagram of a pixel light field resulting from combining all the microcell light fields in an active imaging area according to an embodiment of the present disclosure.

For example, the pixel light field information database is:

$$L\_Mij = \begin{bmatrix} L\_M_{11} & \cdots & L\_M_{1t} \\ \vdots & \cdots & \vdots \\ L\_M_{s1} & \cdots & L\_M_{st} \end{bmatrix},$$

where i=1,2, . . . s; and j=1,2, . . . t. It will be appreciated that the parameter s is less than or equal to the number of rows in the micro lens array, and is generally less than the number of rows in the micro lens array, because some micro lenses in the micro lens array may be located outside the active imaging area 4, as shown by the leftmost micro lens 21 and the rightmost micro lens 21 in FIG. 4. Likewise, the parameter t is less than or equal to the number of columns in the micro lens array, and is generally less than the number of columns in the micro lens array. The combining all the microcell light fields in the active imaging area means storing the microcell light field, which is obtained by processing, by a micro lens in the active imaging area, the simulated light rays emitted from the sub-pixels on the display screen corresponding to the micro lens in the active imaging area, in a database to form a data set, i.e., to obtain the pixel light field information database. As shown in FIG. 6, the pixel light field information database can achieve a 3D light field display image as well as both an "in-screen" effect (i.e., the image recedes from the display screen 1 to get away from the viewer) and an "out-of-screen" effect (i.e., the image stands out of the display screen 1 toward the viewer) of the 3D light field display image.

Figure 7:
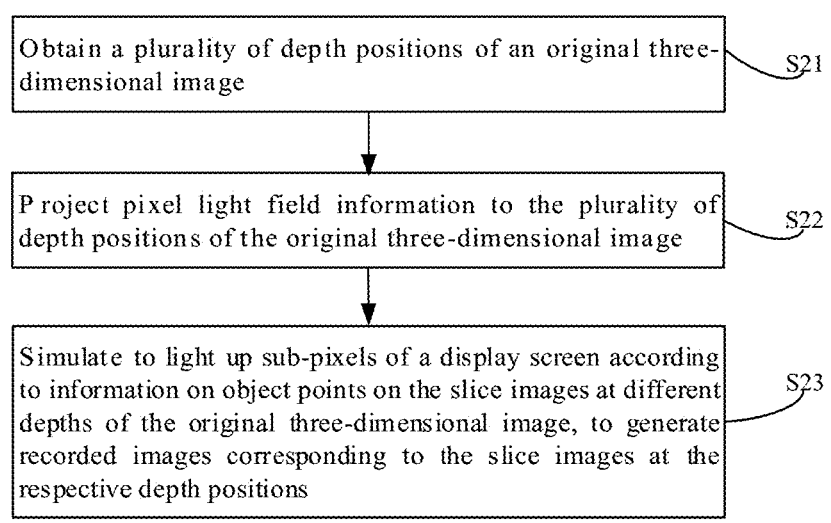
FIG. 7 is a detailed flowchart of step S2 in the light field display method shown in FIG. 1.

As described above, the light field display method provided in the embodiment of FIG. 1 may include step S2 of processing, according to different depth positions of an original three-dimensional image, slice images corresponding to the different depth positions and pixel light field information at the different depth positions, to obtain recorded images of the slice images of the original three-dimensional image at the different depth positions. In an embodiment, step S2 may include the following steps S21 to S23, as shown in FIG. 7.

Step S21 includes obtaining a plurality of depth positions of an original three-dimensional image.

In this step, the original three-dimensional image may be obtained by a light field camera or by a computer, and in this embodiment, the case where a computer generates slice images at different depth positions to obtain the original three-dimensional image is taken as an example.

Step S22 includes projecting pixel light field information to the plurality of depth positions of the original three-dimensional image.

In step S22, the pixel light field information database generated in step S1 may be used for projecting pixel light field information to the plurality of depth positions of the original three-dimensional image. In other words, the following operation may be performed in step S22: according to the generated pixel light field information database, each sub-pixel in the pixel light field recording only one light ray emitted from the corresponding micro lens. That is, the light ray emitted from each sub-pixel includes both position information and direction (i.e., a direction of the connection line between a center of a sub-pixel 11 and a center of the micro lens 21 corresponding to the sub-pixel 11, which is also referred to as the light ray direction) information. The light rays emitted from all sub-pixels are mutually overlapped in the space to form a light ray field in the whole space. The light rays emitted from all sub-pixels may also be mutually overlapped at different depth positions. A plurality of depth positions of the original three-dimensional image are selected, to which the pixel light field information is projected.

Step S23 includes simulating to light up sub-pixels of a display screen according to information on object points on the images at different depths of the original three-dimensional image, to generate recorded images corresponding to the slice images at the respective depth positions.

In step S23, the information on object points includes gray scale information of sub-pixels of which the pixel gray scale is not 0 on the slice images. When a slice image of the three-dimensional object is at a certain depth position, the light ray field intersects with the slice image at the depth position. By comparing the object point coordinates on the slice image with the coordinates of the projected pixel light field at the depth position, the same coordinate position is found, and by reverse tracing, the gray scale information is assigned to the sub-pixel of the display screen corresponding to the light ray at an intersection.

After the gray scale information of all the intersections, where the gray scale values are not 0, is assigned to the corresponding sub-pixels of the display screen, a recorded image corresponding to the slice layer is generated.

Figure 8:
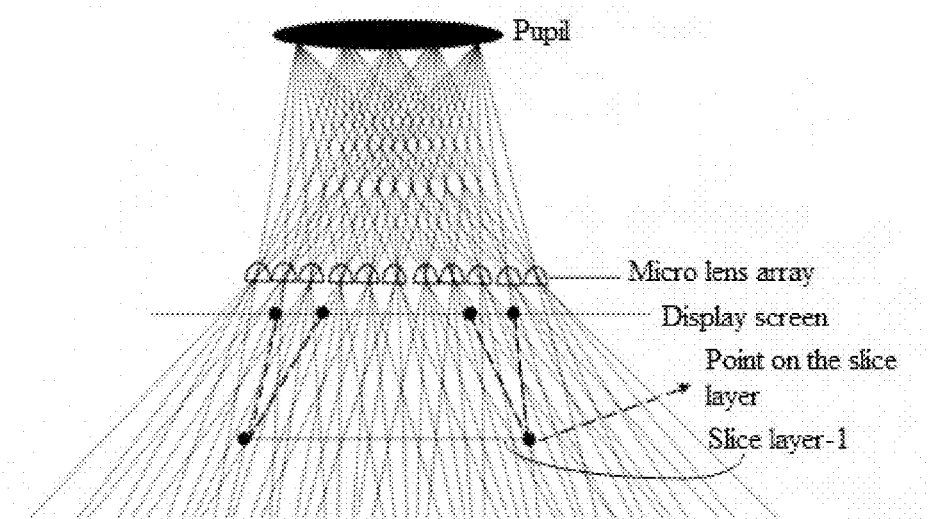
FIG. 8 is a schematic diagram showing a principle of tracking points on a single-layer slice image for corresponding sub-pixels of a display screen according to an embodiment of the present disclosure.

Following the operation of step 2, for example, as shown in FIG. 8: a rectangle has four vertices in the same slice layer, and has a depth, for example, h1. The pixel light field coordinates are projected to the position of depth h1 to obtain coordinates E (x_E, y_E, z_E), where:

$$x\_E = x\_M + h1 * \sin(\beta\_pixel) * \cos(\alpha\_pixel)$$

$$y\_E = y\_M + h1 * \sin(\beta\_pixel) * \sin(\alpha\_pixel)$$

$$z\_E = h1$$

The coordinates of a vertex of the rectangle in this layer are compared with the coordinates E of the projected pixel light field at the depth position to find the same coordinate position. Then, a position of the sub-pixel corresponding to the vertex is reversely traced with the above equations, and the color gray scale information of the vertex of the rectangle is assigned to the corresponding sub-pixel.

In FIG. 8, after information is assigned to all the sub-pixels corresponding to the four vertices of the rectangle, other sub-pixels of the display screen have a gray scale of 0, and finally the recorded image of the rectangle at the depth is obtained.

As described above, the light field display method provided in the embodiment of FIG. 1 may include step S3 of superimposing the recorded images of the slice images of the original three-dimensional image at the different depth positions, to obtain a microcell array image of the original three-dimensional image.

For example, in step S3, the principle of tracing the sub-pixels of the display screen corresponding to the multiple slice layers is respectively tracing sub-pixels of the display screen corresponding to object points on different slice images, to obtain the recorded images of the slice images at different depth positions. By superimposing the recorded images of the slice images of the original three-dimensional image at the different depth positions, a microcell array image of the original three-dimensional image is obtained.

Figure 9:
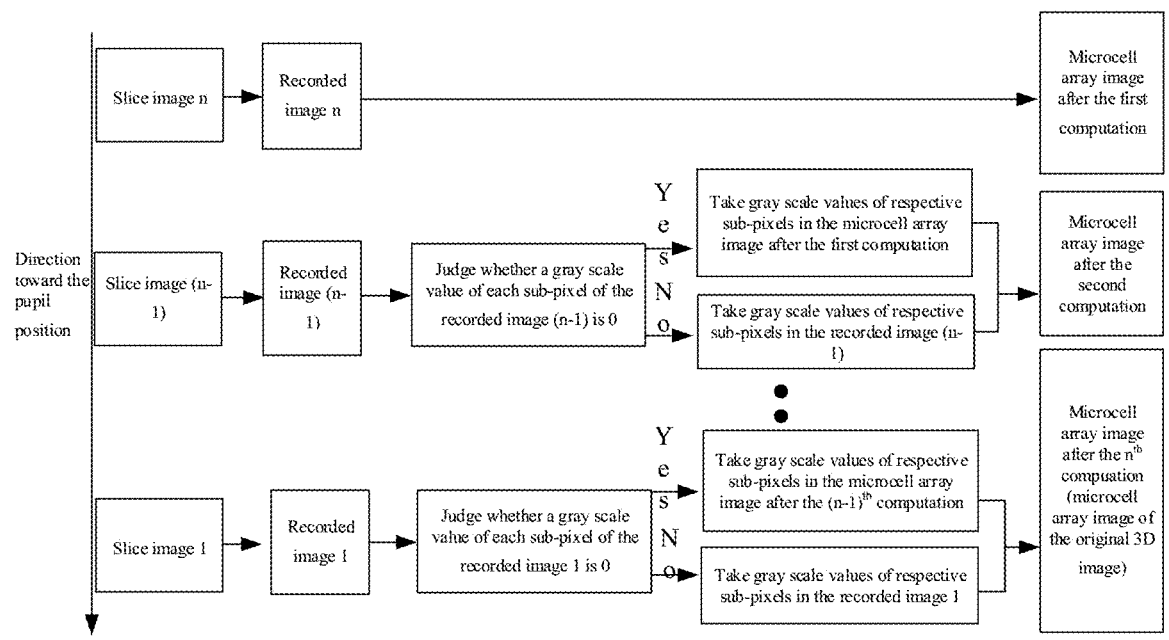
FIG. 9 is a detailed flowchart of step S3 in the light field display method shown in FIG. 1.

Specifically, as shown in FIG. 9, step S3 includes:
obtaining a recorded image n, which is a microcell array image obtained after the first computation, for n slice images of the original three-dimensional image at the different depth positions;
obtaining a recorded image (n-1);
superimposing the recorded image (n-1) with the recorded image n to obtain a microcell array image after the second computation, which may include the steps of:
judging (or determining) whether the gray scale value of each sub-pixel of the recorded image (n-1) is 0;
if the gray scale value of a sub-pixel of the recorded image (n-1) is 0, setting the gray scale value of the sub-pixel at that position of the microcell array image after the second computation to a gray scale value of the corresponding sub-pixel position in the microcell array image after the first computation; and if the gray scale value of a sub-pixel of the recorded image (n-1) is not 0, setting the gray scale value of the sub-pixel at that position of the microcell array image after the second computation to a gray scale value of the corresponding sub-pixel position of the recorded image (n-1);

thereby obtaining the microcell array image after the second computation;

obtaining a recorded image (n-2);

superimposing the recorded image (n-2) with the recorded image (n-1) to obtain a microcell array image after the third computation, which may include the steps of:

judging whether the gray scale value of each sub-pixel of the recorded image (n-2) is 0;

if the gray scale value of a sub-pixel of the recorded image (n-2) is 0, setting the gray scale value of the sub-pixel at that position of the microcell array image after the third computation to a gray scale value of the corresponding sub-pixel position in the microcell array image after the second computation; and if the gray scale value of a sub-pixel of the recorded image (n-2) is not 0, setting the gray scale value of the sub-pixel at that position of the microcell array image after the third computation to a gray scale value of the corresponding sub-pixel position of the recorded image (n-2);

thereby obtaining the microcell array image after the third computation; and repeating the process until obtaining a microcell array image after the n-th computation as the microcell array image of the original three-dimensional image;

where n represents the number of slice images, and is an integer greater than 1. For the n slice images of the original three-dimensional image at the different depth positions, a slice image (m-1) and a slice image m represent any two adjacent slice images, and the slice image (m-1) is closer to a pupil position than the slice image m, where 2≤m≤n.

Each microcell array image may be obtained by performing steps S21, S22, and S23 on the corresponding slice image.

The prescribed value a is set to the range of: being greater than or equal to 0, and less than an upper limit of the gray scale value.

Figure 10:
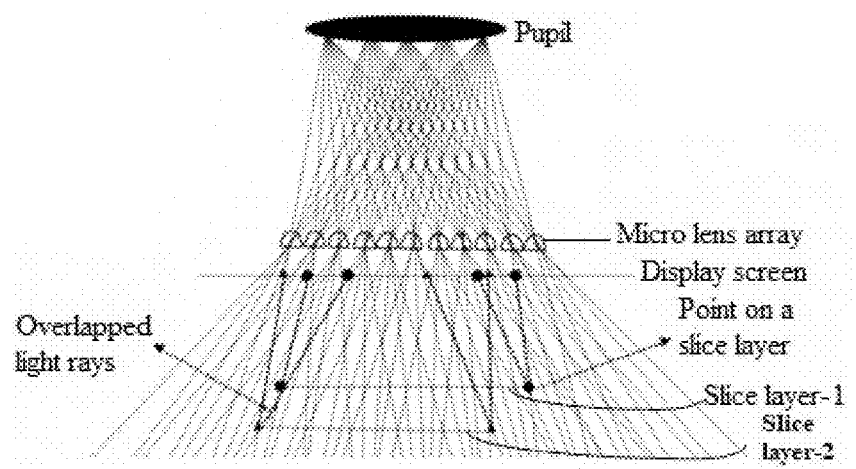
FIG. 10 is a schematic diagram showing a principle of tracking points on a multi-layer slice image for corresponding sub-pixels of a display screen according to an embodiment of the present disclosure.

For example, as shown in FIG. 10, when the recorded images of the slice images are superimposed, there may be a case where the object points at different depth positions correspond to sub-pixels of the display screen at the same position. At this time, the principle of assigning gray scale values to the sub-pixels of the display screen follows the actual object occlusion relationship, and the gray scale information is assigned to each sub-pixel at a depth position away from the pupil. As shown in FIG. 10, in a case where the light rays are overlapped, the slice layer 1 (i.e., the layer or plane where the first slice image is located) and the slice layer 2 (i.e., the layer or plane where the second slice image is located) trace to the same light ray, and when the sub-pixels are traced, the gray scale information of the slice layer 1 is assigned to the sub-pixels.

Figure 11:
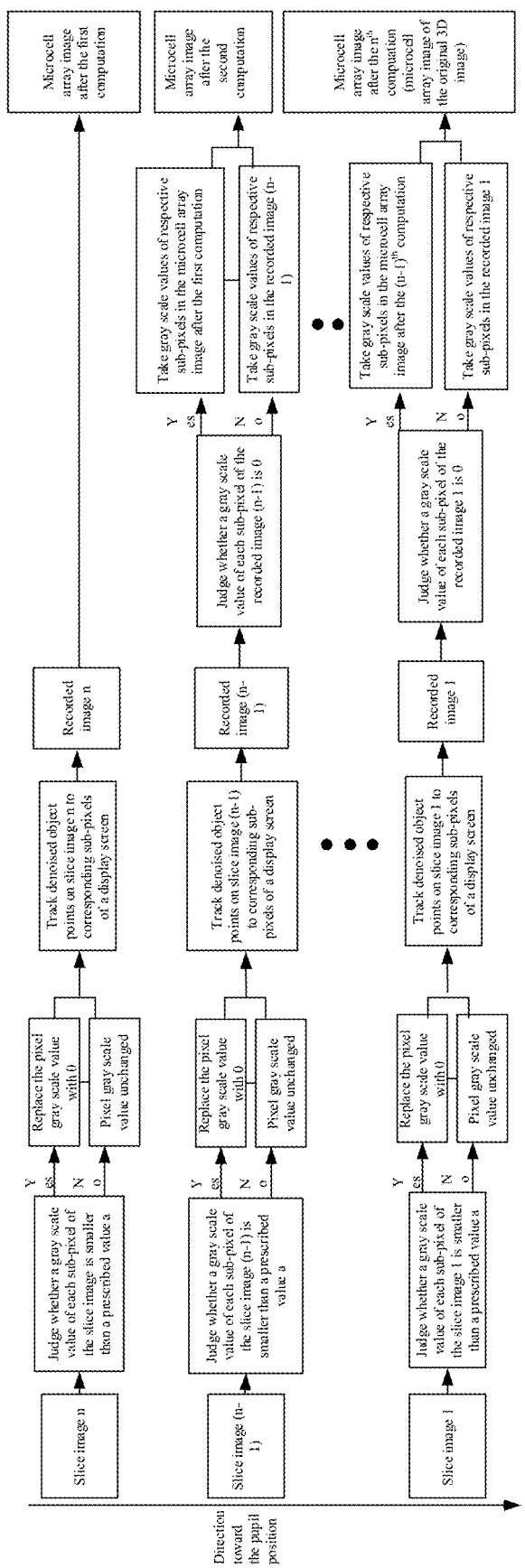
FIG. 11 is a detailed flowchart of steps S2 and S3 in the light field display method shown in FIG. 1.

In another embodiment of the present disclosure, before simulating to light up sub-pixels of a display screen according to information on object points on the slice images at the different depth positions of the original three-dimensional image, to generate recorded images corresponding to the slice images at the respective depth positions, the slice images of the original three-dimensional image at the depth positions may be further denoised. In this embodiment, the original three-dimensional image is obtained by taking a case where a computer generates slice images at different depth positions as an example. As shown in FIG. 11, the step of obtaining a microcell array image of the original three-dimensional image by calculating from the slice images, including denoising the slice images, may include the steps of:

denoising a slice image n for n slice images of the original three-dimensional image at the different depth positions, including: successively judging whether the gray scale value of each sub-pixel of the slice image n is smaller than a prescribed value (i.e., preset threshold) a;

if the gray scale value of a sub-pixel of the slice image n is smaller than the prescribed value a, replacing the gray scale value of the sub-pixel with 0; and if the gray scale value of a sub-pixel of the slice image n is not smaller than the prescribed value a, keeping the gray scale value of the sub-pixel unchanged;

obtaining a recorded image n by tracking denoised object points on the slice image n after the denoising calculation to corresponding sub-pixels on the screen, to obtain a microcell array image after the first computation;

denoising a slice image (n-1), including: successively judging whether the gray scale value of each sub-pixel of the slice image (n-1) is smaller than the prescribed value a;

if the gray scale value of a sub-pixel of the slice image (n-1) is smaller than the prescribed value a, replacing the gray scale value of the sub-pixel with 0; and if the gray scale value of a sub-pixel of the slice image (n-1) is not smaller than the prescribed value a, keeping the gray scale value of the sub-pixel unchanged;

obtaining a recorded image (n-1) by tracking denoised object points on the slice image (n-1) after the denoising calculation to corresponding sub-pixels on the screen;

superimposing the recorded image (n-1) with the recorded image n to obtain a microcell array image after the second computation, where the superimposing may include the steps of:

judging whether the gray scale value of each sub-pixel of the recorded image (n-1) is 0;

if the gray scale value of a sub-pixel of the recorded image (n-1) is 0, setting the gray scale value of the sub-pixel at that position of the microcell array image after the second computation to a gray scale value of the corresponding sub-pixel position in the microcell array image after the first computation; and if the gray scale value of a sub-pixel of the recorded image (n-1) is not 0, setting the gray scale value of the sub-pixel at that position of the microcell array image after the second computation to a gray scale value of the corresponding sub-pixel position of the recorded image (n-1);

thereby obtaining the microcell array image after the second computation;

denoising a slice image (n-2), including: successively judging whether the gray scale value of each sub-pixel of the slice image (n-2) is smaller than the prescribed value a;

if the gray scale value of a sub-pixel of the slice image (n-2) is smaller than the prescribed value a, replacing the gray scale value of the sub-pixel with 0; and if the gray scale value of a sub-pixel of the slice image (n-2) is not smaller than the prescribed value a, keeping the gray scale value of the sub-pixel unchanged;

obtaining a recorded image (n-2) by tracking denoised object points on the slice image (n-2) after the denoising calculation to corresponding sub-pixels on the screen;

superimposing the recorded image (n-2) with the recorded image (n-1) to obtain a microcell array image after the third computation, where the superimposing may include the steps of:

judging whether the gray scale value of each sub-pixel of the recorded image (n-2) is 0;

if the gray scale value of a sub-pixel of the recorded image (n-2) is 0, setting the gray scale value of the sub-pixel at that position of the microcell array image after the third computation to a gray scale value of the corresponding sub-pixel position in the microcell array image after the second computation; and if the gray scale value of a sub-pixel of the recorded image (n-2) is not 0, setting the gray scale value of the sub-pixel at that position of the microcell array image after the third computation to a gray scale value of the corresponding sub-pixel position of the recorded image (n-2);

thereby obtaining the microcell array image after the third computation; and repeating the process until obtaining a microcell array image after the n-th computation as the microcell array image of the original three-dimensional image, i.e., until obtaining a microcell array image of the original three-dimensional image;

where n represents the number of slice images, and is an integer greater than 1. For the n slice images at the different depth positions, a slice image (m-1) and a slice image m represent any two adjacent slice images, and the slice image (m-1) is closer to a pupil position than the slice image m, where $2 \leq m \leq n$.

In this embodiment, the denoised object point is defined as a sub-pixel of which the pixel gray scale is not 0 on the slice image after the denoising calculation; and The prescribed value a is set to the range of: being greater than or equal to 0, and less than an upper limit of the gray scale value.

It will be appreciated that whether to denoise a slice image of the original three-dimensional image at a certain depth position may be selected flexibly, or may depend on the quality of the slice image of the original three-dimensional image at the depth position. The denoising may be selected to be performed on slice images at only one or more of the depth positions. Apparently, the denoising of the slice images at the plurality of depth positions includes denoising the slice images at some of the depth positions, or denoising the slice images at all depth positions.

If the slice image at a depth position is not to be denoised, step S23 may be directly performed on the slice image at that depth position to obtain the recorded image corresponding to the slice image at that depth position.

Figure 12:
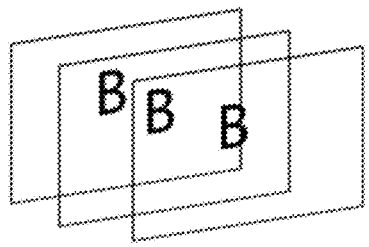
FIG. 12 is a schematic diagram showing slice images of an original three-dimensional image at three depth positions according to an embodiment of the present disclosure.

To better illustrate the computation effect of the embodiment shown in FIG. 11, as shown in FIG. 12, the original three-dimensional image is composed of three letters B of different color depths, respectively corresponding to different depth positions, and for convenience of presenting different depth effects, the respective letters of the three slice images correspond to different positions but have a same size. In the mapping, black represents no light field information, which is a transparent area in actual observation. In order to present the slicing effect, the background except the letter B is set to be transparent, which is black in the actual two-dimensional image. The recorded image corresponding to the slice image is to be finally displayed on a display screen.

Figure 13:
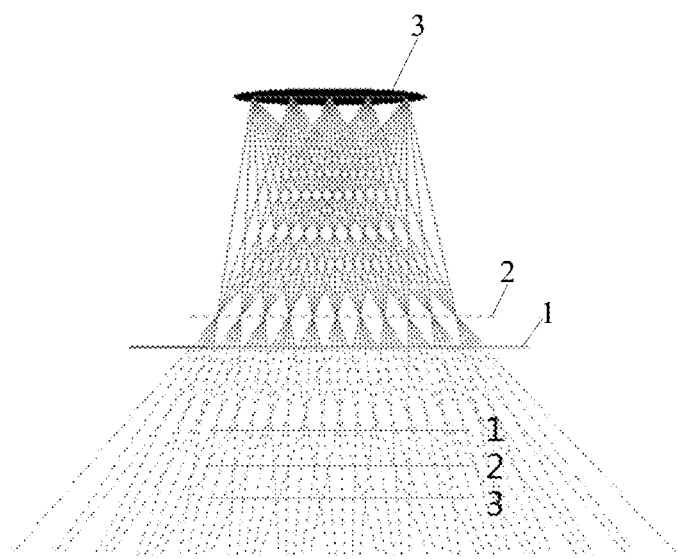
FIG. 13 is a schematic diagram of slice images at different depth positions according to an embodiment of the present disclosure.
Figure 14:
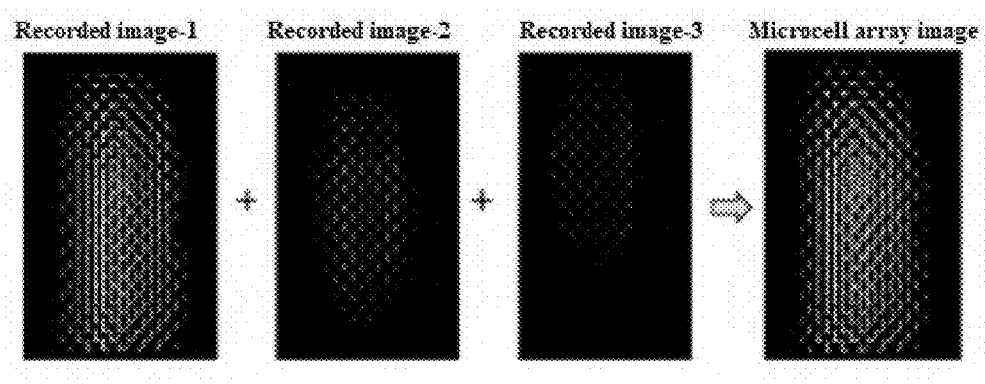
FIG. 14 is a schematic diagram of a microcell array image generated by superimposing slice images of the pixel light field taken at different depth positions in FIG. 13.

As shown in FIGS. 13 and 14, a recorded image of a slice image at a depth position 2 is superimposed with a recorded image of a slice image at a depth position 3 to obtain an image which is further superimposed with a recorded image of a slice image at a depth position 1, thereby obtaining a microcell array image of the original three-dimensional image.

The obtained microcell array image of the original three-dimensional image is then provided to the display screen 1 which displays according to the microcell array image. The display content enters human eyes after passing through the micro lens array 2 on the display side (i.e., a light-emitting side) of the display screen 1, thereby realizing 3D display.

Figure 15:
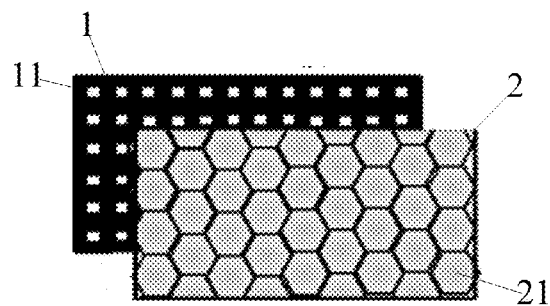
FIG. 15 is a schematic diagram of an experimental test display device for an actual test of the light field display effect according to an embodiment of the present disclosure.

As shown in FIG. 15, an experimental test display device for an actual test of the light field display effect is shown. The experimental test display device adopts a 2.1-inch colorful 3K display screen 1, each sub-pixel 11 is a rectangle having a size of 7.3 um*10.95 um, an orthogonal projection of each micro lens 21 on the display screen 1 is a regular hexagon, and each micro lens 21 has a side length of 0.761 mm, a radius of curvature of 3.269 mm, and a placement height (i.e., the distance between the micro lens 21 and the display screen 1 (i.e., the distance between the micro lens array 2 and the display screen 1)) of 9.5038 mm. The micro lens array 2 is placed on the display side of the display screen 1, and the display screen 1 loads the microcell array image. A position of the micro lens array 2 is adjusted so that a user may observe a clear light field image.

Figure 16:
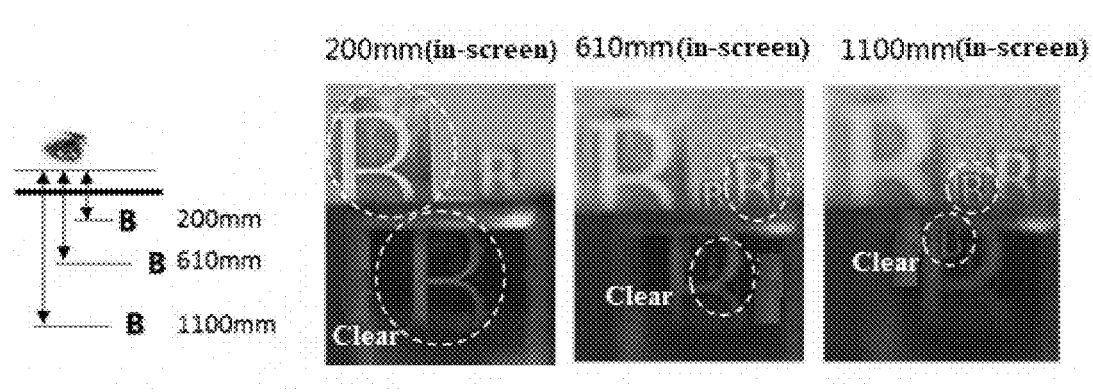
FIG. 16 is schematic diagram showing a test effect of actual light field display of an original three-dimensional image according to an embodiment of the present disclosure.

The actual observed effect is as shown in FIG. 16. The actual observed effect diagrams at three depths, i.e., 200 mm, 610 mm and 1100 mm, are respectively plotted, where a single lens reflex camera is used in replacement of human eyes for observation. Meanwhile, pictures of the real objects of the same size as the simulated depth pictures are prepared and placed at the respective depth positions. The single lens reflex camera is configured to focus images at different depth positions respectively to obtain clear images at the positions, while the slice images at other depth positions are fuzzy, thereby realizing the monocular stereoscopic visual display effect. In FIG. 16, the upper virtual circles show images of the real objects captured by the camera at the respective depths, and the lower virtual circles show the clearest images of the respective depths displayed on the display screen.

Figure 17:
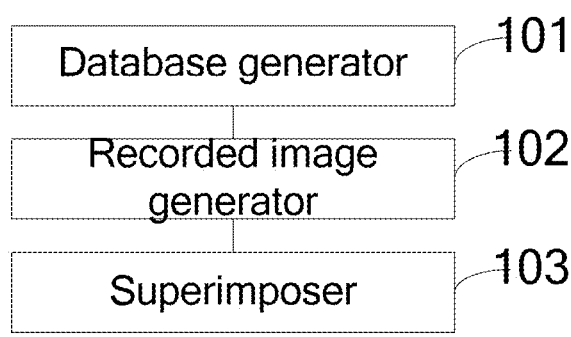
FIG. 17 is a functional block diagram of a light field display system according to an embodiment of the present disclosure.

Based on the light field display method as described above, this embodiment further provides a light field display system. As shown in FIG. 17, the light field display system may include: a database generator 101 configured to generate a pixel light field information database; a recorded image generator 102 configured to process, according to different depth positions of an original three-dimensional image, slice images corresponding to the different depth positions and pixel light field information at the different depth positions, to obtain recorded images of the slice images of the original three-dimensional image at the different depth positions; and a superimposer 103 configured to superimpose the recorded images of the slice images of the original three-dimensional image at the different depth positions, to obtain a microcell array image of the original three-dimensional image.

It will be appreciated that each of the database generator 101, the recorded image generator 102, and the superimposer 103 of the light field display system shown in FIG. 17 may be implemented by hardware, software, or a combination of hardware and software. For example, each of the database generator 101, the recorded image generator 102, and the superimposer 103 may be a general purpose central processing unit (CPU), an application processor (AP), an image processing unit (GPU), or an integrated circuit (IC) having the respective functions described in the foregoing embodiments of the present disclosure. Alternatively, the light field display system shown in FIG. 17 may include a CPU and a memory. The memory has a computer program stored thereon, and the computer program, when executed by the CPU, causes the CPU to serve as the database generator 101, the recorded image generator 102 and the superimposer 103.

In the present disclosure, the depth may refer to a distance between the plane where each slice image is located and the plane where the micro lens array is located, as shown in the left part of FIG. 16.

In the present disclosure, the combining all the microcell light fields in the active imaging area includes: storing the microcell light field, which is obtained by processing, by a micro lens in the active imaging area, the simulated light rays emitted from the sub-pixels on the display screen corresponding to the micro lens in the active imaging area, in a database to form a data set.

In the present disclosure, the term "project" may refer to assigning light field information of a certain sub-pixel in the light field information base to a corresponding sub-pixel in a certain slice image along the direction of light ray tracing; and the term "superimpose" may refer to respectively assigning effective information of respective sub-pixels in a plurality of recorded images to the corresponding sub-pixels in a same display panel.

The light field display method provided in the foregoing embodiments of the present disclosure can achieve at least the following beneficial effects: a pixel light field information database is obtained by calculation, after which the recorded images of the slice images of the original three-dimensional image at the different depth positions and a microcell array image of the original three-dimensional image are obtained by subsequent processing, both based on the calculation results in the pixel light field information database, so no further calculation is needed. Therefore, compared with the conventional method for generating a microcell array image of the original three-dimensional image, in the light field display method provided in the foregoing embodiments of the present disclosure, the calculation amount is reduced, and the microcell array image of the original three-dimensional image can be obtained more efficiently.

Another embodiment of the present disclosure provides a storage medium (e.g., a non-transitory computer readable storage medium) having stored thereon a computer program which, when executed by a processor, implements the light field display method according to any one of the above embodiments of the present disclosure.

By storing the computer program that implements the light field display method according to any one of the above embodiments of the present disclosure, the storage medium can reduce the calculation amount involved in obtaining the microcell array image of the original three-dimensional image, and improve the efficiency in obtaining the microcell array image of the original three-dimensional image.

Another embodiment of the present disclosure provides a display panel, which may include the storage medium according to the above embodiment.

By including the storage medium according to the above embodiment, the display panel can not only implement the light field display of a three-dimensional image so that human eyes can observe the image without a dizzy feeling, but also reduce the calculation amount involved in obtaining the microcell array image of the original three-dimensional image, and improve the efficiency in obtaining the microcell array image of the original three-dimensional image.

The display panel provided in the present disclosure may be in the form of a liquid crystal display (LCD) panel, an organic light-emitting diode (OLED) display panel, a quantum dot light-emitting diode (QLED) display panel, a micro light-emitting diode (miniLED or microLED) display panel, or the like. The light field display method and system, the storage medium and the display panel provided in the present disclosure may be applied to any product or component with a display function, such as a television, a monitor, a laptop computer, a tablet computer, a mobile phone, a wearable device, a navigator, or the like.

It will be appreciated that the above implementations are merely exemplary implementations for the purpose of illustrating the principle of the present disclosure, and the preset disclosure is not limited thereto. Various modifications and improvements can be made by a person having ordinary skill in the art without departing from the protection scope of the disclosure defined in the accompanying claims, and accordingly, all of such modifications and improvements fall into the protection scope of the present disclosure.

What is claimed is:

1. A light field display method, comprising:
generating a pixel light field information database;
processing, according to different depth positions of an original three-dimensional image, slice images corresponding to the different depth positions and pixel light field information at the different depth positions, to obtain recorded images of the slice images of the original three-dimensional image at the different depth positions; and
superimposing the recorded images of the slice images of the original three-dimensional image at the different depth positions, to obtain a microcell array image of the original three-dimensional image;
wherein the superimposing the recorded images of the slice images of the original three-dimensional image at the different depth positions, to obtain the microcell array image of the original three-dimensional image comprises: obtaining the recorded images of the slice images at the different depth positions; and superimposing the recorded images of the slice images at the different depth positions to obtain the microcell array image of the original three-dimensional image; and
wherein the superimposing the recorded images of the slice images at the different depth positions to obtain the microcell array image of the original three-dimensional image comprises:
obtaining a recorded image n, which is a microcell array image obtained after a first computation, for n slice images of the original three-dimensional image at the different depth positions;
obtaining a recorded image (n-1), which is then superimposed with the recorded image n to obtain a microcell array image after a second computation;
obtaining a recorded image (n-2), which is then superimposed with the recorded image (n-1) to obtain a microcell array image after a third computation; and repeating the process until obtaining a microcell array image after an n-th computation as the microcell array image of the original three-dimensional image;

where n represents the number of slice images of the original three-dimensional image at different depth positions, and n is an integer greater than 1, and for the n slice images of the original three-dimensional image at the different depth positions, a slice image (m-1) at a depth position and a slice image m at another depth position are slice images at any two adjacent depth positions, and the slice image (m-1) at the depth position is closer to a pupil position than the slice image m at the another depth position, where 2≤m≤n.

2. The light field display method according to claim 1, wherein the generating the pixel light field information database comprises:

determining a pupil position, an angle of field of view, and a viewing distance according to information on a display screen and information on a micro lens array; wherein the micro lens array comprises a plurality of micro lenses arranged in an array, and the display screen comprises a plurality of sub-pixels arranged in an array;

determining an active imaging area and an inactive imaging area of the display screen according to the pupil position, the angle of field of view and the viewing distance;

enabling each micro lens in the active imaging area to correspond to multiple sub-pixels on the display screen and process simulated light rays emitted from the multiple sub-pixels, to form a microcell light field; and combining all the microcell light fields in the active imaging area to obtain the pixel light field information database.

3. The light field display method according to claim 1, wherein the processing, according to different depth positions of the original three-dimensional image, slice images corresponding to the different depth positions and pixel light field information at the different depth positions, to obtain recorded images of the slice images of the original three-dimensional image at the different depth positions comprises:

obtaining a plurality of depth positions of the original three-dimensional image;

projecting pixel light field information to the plurality of depth positions of the original three-dimensional image; and simulating to light up sub-pixels of a display screen according to information on object points on the slice images at the different depth positions of the original three-dimensional image, to generate recorded images corresponding to the slice images at the respective depth positions;

wherein the information on object points comprises gray scale information of sub-pixels of which the pixel gray scale is not 0 on the slice images at the different depth positions.

4. The light field display method according to claim 2, wherein the enabling each micro lens in the active imaging area to correspond to the multiple sub-pixels on the display screen and process simulated light rays emitted from the multiple sub-pixels, to form a microcell light field comprises:

obtaining a correspondence relationship between each micro lens in the active imaging area and sub-pixels of the display screen; and combining light field information of the light rays emitted from the multiple sub-pixels on the display screen corresponding to the micro lens, to form the microcell light field of the micro lens.

5. A light field display method, comprising:

generating a pixel light field information database;

processing, according to different depth positions of an original three-dimensional image, slice images corresponding to the different depth positions and pixel light field information at the different depth positions, to obtain recorded images of the slice images of the original three-dimensional image at the different depth positions; and superimposing the recorded images of the slice images of the original three-dimensional image at the different depth positions, to obtain a microcell array image of the original three-dimensional image;

wherein the generating the pixel light field information database comprises: determining a pupil position, an angle of field of view, and a viewing distance according to information on a display screen and information on a micro lens array; wherein the micro lens array comprises a plurality of micro lenses arranged in an array, and the display screen comprises a plurality of sub-pixels arranged in an array; determining an active imaging area and an inactive imaging area of the display screen according to the pupil position, the angle of field of view and the viewing distance; enabling each micro lens in the active imaging area to correspond to multiple sub-pixels on the display screen and process simulated light rays emitted from the multiple sub-pixels, to form a microcell light field; and combining all the microcell light fields in the active imaging area to obtain the pixel light field information database;

wherein the enabling each micro lens in the active imaging area to correspond to the multiple sub-pixels on the display screen and process simulated light rays emitted from the multiple sub-pixels, to form a microcell light field comprises: obtaining a correspondence relationship between each micro lens in the active imaging area and sub-pixels of the display screen; and combining light field information of the light rays emitted from the multiple sub-pixels on the display screen corresponding to the micro lens, to form the microcell light field of the micro lens; and wherein the combining light field information of the light rays emitted from the multiple sub-pixels on the display screen corresponding to the micro lens, to form the microcell light field of the micro lens comprises:

generating a space rectangular coordinate system comprising a plane rectangular coordinate system composed of an X axis and a Y axis generated in a plane where the micro lens array is located, and a Z axis vertical to a plane where the plane rectangular coordinate system is located; wherein an origin of the space rectangular coordinate system is a center of the micro lens at a center of the micro lens array; and wherein the light field information of the microcell light field of each micro lens is ($x\_M$, $y\_M$, $z\_M$, $\alpha\_pixel$, $\beta\_pixel$); where $x\_M$ is an X-axis coordinate of the micro lens in the space rectangular coordinate system; $y\_M$ is a Y-axis coordinate of the micro lens in the space rectangular coordinate system; and $z\_M$ is a Z-axis coordinate of the micro lens in the space rectangular coordinate system; and $$\alpha\_pixel = a\tan\left(\frac{y\_p - y\_M}{x\_p - x\_M}\right);$$

$$\beta\_pixel = a\tan\left(\frac{\sqrt{(y\_p - y\_M)^2 + (x\_p - x\_M)^2}}{z\_p - z\_M}\right)$$

where x_p is an X-axis coordinate of a sub-pixel on the display screen corresponding to the micro lens in the space rectangular coordinate system; y_p is a Y-axis coordinate of the sub-pixel on the display screen corresponding to the micro lens in the space rectangular coordinate system; and z_p is a Z-axis coordinate of the sub-pixel on the display screen corresponding to the micro lens in the space rectangular coordinate system.

6. The light field display method according to claim 1, wherein the obtaining the recorded image (n-1), which is then superimposed with the recorded image n to obtain the microcell array image after the second computation comprises: judging whether a gray scale value of each sub-pixel of the recorded image (n-1) is 0; if the gray scale value of a sub-pixel of the recorded image (n-1) is 0, setting the gray scale value of the sub-pixel at that position of the microcell array image after the second computation to a gray scale value of a corresponding sub-pixel position in the microcell array image after the first computation; and if the gray scale value of a sub-pixel of the recorded image (n-1) is not 0, setting the gray scale value of the sub-pixel at that position of the microcell array image after the second computation to a gray scale value of the corresponding sub-pixel position of the recorded image (n-1); and the obtaining the recorded image (n-2), which is then superimposed with the recorded image (n-1) to obtain the microcell array image after the third computation comprises: judging whether a gray scale value of each sub-pixel of the recorded image (n-2) is 0; if the gray scale value of a sub-pixel of the recorded image (n-2) is 0, setting the gray scale value of the sub-pixel at that position of the microcell array image after the third computation to a gray scale value of the corresponding sub-pixel position in the microcell array image after the second computation; and if the gray scale value of a sub-pixel of the recorded image (n-2) is not 0, setting the gray scale value of the sub-pixel at that position of the microcell array image after the third computation to a gray scale value of the corresponding sub-pixel position of the recorded image (n-2).

7. The light field display method according to claim 3, wherein the simulating to light up sub-pixels of the display screen according to information on object points on the slice images at the different depth positions of the original three-dimensional image, to generate recorded images corresponding to the slice images at the respective depth positions comprises:

denoising the slice images of the original three-dimensional image at one or more depth positions.

8. The light field display method according to claim 7, wherein the denoising the slice images of the original three-dimensional image at one or more depth positions comprises:

selecting a depth image k of the original three-dimensional image;

successively judging whether a gray scale value of each sub-pixel of the depth image k of the original three-dimensional image is smaller than a prescribed value a;

if the gray scale value of a sub-pixel of the depth image k of the original three-dimensional image is smaller than the prescribed value a, replacing the gray scale value of the sub-pixel with 0; and if the gray scale value of a sub-pixel of the depth image k of the original three-dimensional image is not smaller than the prescribed value a, keeping the gray scale value of the sub-pixel unchanged;

thereby obtaining a denoised depth image k of the three-dimensional image;

where a>0; and k is a positive integer.

9. The light field display method according to claim 2, wherein the micro lens array is located on a display side of the display screen;

the information on the display screen comprises a size of each sub-pixel on the display screen; and the information on the micro lens array comprises a radial dimension of each micro lens and a distance between the micro lens array and the display screen.

10. The light field display method according to claim 9, wherein the information on the display screen further comprises a size of the display screen.

11. The light field display method according to claim 9, wherein the information on the micro lens array further comprises a shape, a focal length, a radius of curvature, and a refractive index of each of the plurality of micro lenses.

12. The light field display method according to claim 9, wherein each of the micro lens is a convex lens or a set of lenses.

13. The light field display method according to claim 9, wherein an orthogonal projection of each micro lens on the display screen has any one of a hexagonal shape, an elliptical shape, a circular shape, or a diamond shape.

14. The light field display method according to claim 1, wherein a depth refers to a distance between a plane where each slice image is located and a plane where the micro lens array is located.

15. The light field display method according to claim 2, wherein the combining all the microcell light fields in the active imaging area comprises: storing the microcell light field, which is obtained by processing, by a micro lens in the active imaging area, the simulated light rays emitted from the sub-pixels on the display screen corresponding to the micro lens in the active imaging area, in a database to form a data set.

16. A light field display system, comprising:

a database generator configured to generate a pixel light field information database;

a recorded image generator configured to process, according to different depth positions of an original three-dimensional image, slice images corresponding to the different depth positions and pixel light field information at the different depth positions, to obtain recorded images of the slice images of the original three-dimensional image at the different depth positions; and a superimposer configured to superimpose the recorded images of the slice images of the original three-dimensional image at the different depth positions, to obtain a microcell array image of the original three-dimensional image;

wherein the superimposer is further configured to perform operations comprising: obtaining the recorded images of the slice images at the different depth positions; and superimposing the recorded images of the slice images at the different depth positions to obtain the microcell array image of the original three-dimensional image; and wherein the superimposer is further configured to perform operations comprising:

obtaining a recorded image n, which is a microcell array image obtained after a first computation, for n slice images of the original three-dimensional image at the different depth positions;

obtaining a recorded image (n-1), which is then superimposed with the recorded image n to obtain a microcell array image after a second computation;

obtaining a recorded image (n-2), which is then superimposed with the recorded image (n-1) to obtain a microcell array image after a third computation; and repeating the process until obtaining a microcell array image after an n-th computation as the microcell array image of the original three-dimensional image;

where n represents the number of slice images of the original three-dimensional image at different depth positions, and n is an integer greater than 1, and for the n slice images of the original three-dimensional image at the different depth positions, a slice image (m-1) at a depth position and a slice image m at another depth position are slice images at any two adjacent depth positions, and the slice image (m-1) at the depth position is closer to a pupil position than the slice image m at the another depth position, where $2 \leq m \leq n$.

17. A non-transitory computer readable storage medium having stored thereon a computer program which, when executed by a processor, implements the light field display method according to claim 1.

18. A display panel, comprising the non-transitory computer readable storage medium according to claim 17.

19. A non-transitory computer readable storage medium having stored thereon a computer program which, when executed by a processor, implements the light field display method according to claim 5.

20. A display panel, comprising the non-transitory computer readable storage medium according to claim 19.

* * * * *